United States Patent
Colwell et al.

(10) Patent No.: US 11,710,302 B2
(45) Date of Patent: Jul. 25, 2023

(54) METHOD AND SYSTEM FOR SINGLE PASS OPTICAL CHARACTER RECOGNITION

(71) Applicant: Tricentis GmbH, Vienna (AT)

(72) Inventors: David Colwell, Surry Hills (AU); Michael Keeley, Auckland (NZ)

(73) Assignee: TRICENTIS GMBH, Vienna (AT)

( * ) Notice: Subject to any disclaimer, the term of this patent is extended or adjusted under 35 U.S.C. 154(b) by 267 days.

(21) Appl. No.: 17/092,166

(22) Filed: Nov. 6, 2020

(65) Prior Publication Data

US 2021/0142093 A1    May 13, 2021

Related U.S. Application Data

(60) Provisional application No. 62/932,616, filed on Nov. 8, 2019.

(51) Int. Cl.
*G06V 10/00* (2022.01)
*G06V 10/82* (2022.01)
(Continued)

(52) U.S. Cl.
CPC ............... *G06V 10/82* (2022.01); *G06N 3/08* (2013.01); *G06V 20/62* (2022.01); *G06V 30/153* (2022.01);
(Continued)

(58) Field of Classification Search
CPC ...... G06V 30/153; G06V 20/62; G06V 10/82; G06V 30/18057; G06V 30/10; G06N 3/08; G06N 3/0481; G06N 3/0454
See application file for complete search history.

(56) References Cited

U.S. PATENT DOCUMENTS

| 10,540,579 B2 * | 1/2020 | Reisswig ......... G06V 30/19173 |
| 2011/0211759 A1 * | 9/2011 | Park ..................... G06V 30/182 |
| | | 382/182 |

(Continued)

FOREIGN PATENT DOCUMENTS

CN        110032998 A    *    7/2019

OTHER PUBLICATIONS

Chou etal, EAST: An Efficient and Accurate Scene Text Detector, Proceedings of the IEEE Conference on Computer Vision and Pattern Recognition (CVPR), pp. 5551-5560 (Year: 2017).*

(Continued)

*Primary Examiner* — Nancy Bitar
*Assistant Examiner* — Xiao Liu
(74) *Attorney, Agent, or Firm* — Haynes and Boone, LLP

(57) ABSTRACT

A computer implemented method of performing single pass optical character recognition (OCR) including at least one fully convolutional neural network (FCN) engine including at least one processor and at least one memory, the at least one memory including instructions that, when executed by the at least processor, cause the FCN engine to perform a plurality of steps. The steps include preprocessing an input image, extracting image features from the input image, determining at least one optical character recognition feature, building word boxes using the at least one optical character recognition feature, determining each character within each word box based on character predictions and transmitting for display each word box including its predicted corresponding characters.

18 Claims, 5 Drawing Sheets

(51) Int. Cl.
    *G06N 3/08* (2023.01)
    *G06V 30/148* (2022.01)
    *G06V 20/62* (2022.01)
    *G06V 30/18* (2022.01)
    *G06V 30/10* (2022.01)

(52) U.S. Cl.
    CPC ........ *G06V 30/18057* (2022.01); *G06V 30/10* (2022.01)

(56) References Cited

U.S. PATENT DOCUMENTS

| | | | |
|---|---|---|---|
| 2017/0372156 A1* | 12/2017 | Kalenkov | G06V 30/412 |
| 2018/0137350 A1* | 5/2018 | Such | G06N 3/0445 |
| 2019/0019020 A1* | 1/2019 | Flament | G06F 18/24143 |
| 2020/0082218 A1* | 3/2020 | Hoehne | G06V 10/82 |
| 2020/0387733 A1* | 12/2020 | Odate | G06V 30/153 |

OTHER PUBLICATIONS

Yang et al., Chinese text-line detection from web videos with fully convolutional networks, Big Data Analytics (2018) 3:2, pp. 1-11 (Year: 2018).*

\* cited by examiner

METHOD AND SYSTEM FOR SINGLE PASS OPTICAL CHARACTER RECOGNITION

CROSS-REFERENCE TO RELATED APPLICATIONS

This application claims the benefit of priority of U.S. Provisional Application No. 62/932,616 filed on Nov. 8, 2019, the disclosure of which is incorporated herein by reference in its entirety.

FIELD OF THE INVENTION

Embodiments described herein generally relate to optical character recognition, and more particularly to single pass optical character recognition method and system.

BACKGROUND OF THE INVENTION

Optical Character Recognition (OCR) is a method for extracting text from images that has existed for some time (since the early 2000's). Detecting text in an image is useful in many situations, from scanning invoices into a system, to detecting license plates, etc. However, it has been plagued throughout the years by inaccuracy, performance concerns and a high cost to run. Currently, there are two classes of optical character recognition, that is, algorithmic OCR and recurrent neural network OCR. The algorithmic OCR uses a library of fonts, and tries to match the text against these fonts. It requires prior knowledge of all fonts that may be used, and is very slow. It also slows down as the number of fonts and sizes increases.

Recurrent neural network OCR systems, such as, Tesseract, Google OCR and ABBY OC, use recurrent neural networks to process the text areas and predict the characters. It works well on handwritten digits and machine printed digits, but does not scale well due to the limitations of recurrent networks (they have limited concurrency when executed on highly parallel machinery such as GPUs). This results in slow detections. In addition, the performance scales linearly with the number of text detections, which is not suited for a dense text environment. Hence, an improved optical character recognition system which can be trained to predict text in a machine printed environment at a high level of accuracy is desirable.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Figure 1:
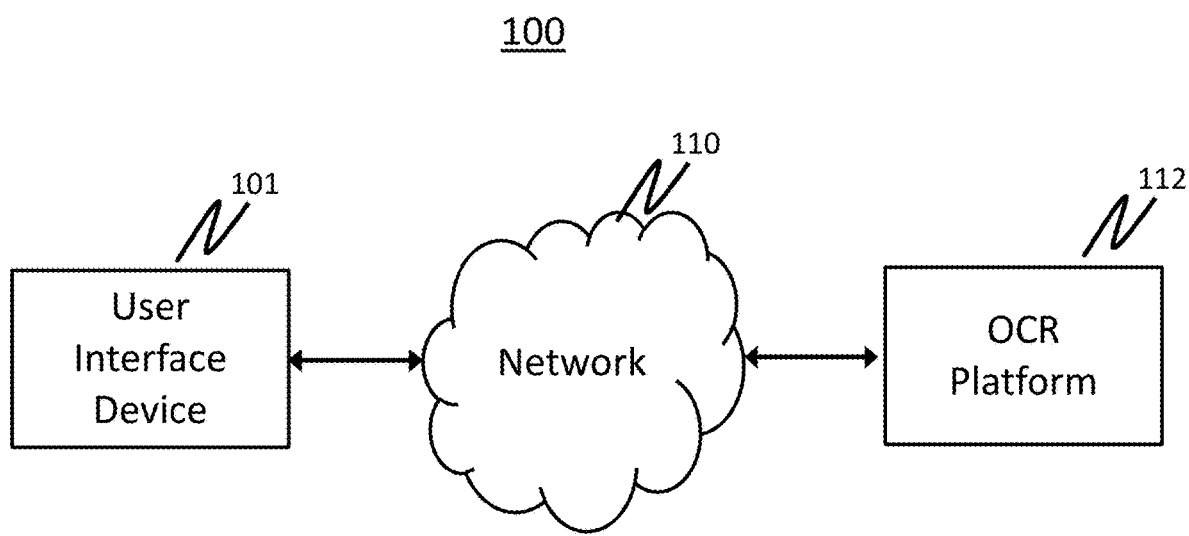
FIG. 1 is a block diagram illustrating an exemplary environment operable to facilitate the control of single pass optical character recognition in accordance with an exemplary embodiment of the present disclosure

The present disclosure relates to a method and system for single pass optical character recognition using a fully convolutional neural network (FCN). Exemplary embodiments disclosed herein describe a computer implemented method of performing single pass optical character recognition (OCR) including at least one fully convolutional neural network (FCN) module including at least one processor and at least one memory, the at least one memory including instructions that, when executed by the at least processor, cause the FCN module to perform a plurality of steps. The steps include preprocessing an input image, extracting image features from the image, creating one or more optical character recognition features from the extracted image features, building text boxes using the one or more optical character recognition features, and building character predictions in a single pass of the FCN.

Additional features and utilities of the present general inventive concept will be set forth in part in the description which follows and, in part, will be obvious from the description, or may be learned by practice of the general inventive concept. The present disclosure together with additional objects, features and advantages will be readily apparent to those of ordinary skill in the art upon reading the following detailed description of the presently preferred, but nonetheless illustrative, embodiments when taken in conjunction with the accompanying drawings.

In this respect, before explaining the current embodiments of the method and system of a single pass optical character recognition, it is to be understood that the method and system of single pass optical character recognition is not limited in its applications to the details of construction and arrangements of the components set forth in the following description or illustration. Those skilled in the art will appreciate that the concept of this disclosure may be readily utilized as a basis for the design of other structures, methods, and systems for carrying out single pass optical character recognition.

DETAILED DESCRIPTION

The present disclosure describes a method and system for single pass optical character recognition using a fully convolutional neural network ("FCN") engine. The FCN engine includes an input layer, one or more layers of convolutional network blocks, one or more pooling layers and an output (i.e., classification) layer. The FCN engine performs algorithmic processing at one or more layers of the engine to perform image processing of an input. The FCN engine takes in arbitrary size images and outputs region level classification for simultaneous detection and classification of the image.

The FCN engine predicts words and/or symbols from an image containing machine printed characters. In some aspects, the words and/or symbols may include phrases, addresses, figures, special characters, or a combination thereof. In other aspects, the input image may include an electronic or digital capture. Non-limiting examples may include electronic images, such as, for example, JPEG, TIFF, GIF, PDFs, photos, screenshots, digital representations, or a digital encoding of an object representation (e.g., html).

The herein described FCN engine processes an entire optical character recognition (i.e., detects all characters in an image) for an image in a single pass through the fully convolutional neural network without multiple iterations being required. Unlike other neural networks (e.g., recurrent neural networks), a FCN is able to transform the height and width of an intermediate layer feature map back to the size of an input image through the transposed convolution layer, so that the predictions have a one-to-one correspondence with input image in spatial dimension (height and width). Given a position on the spatial dimension, the output of the channel dimension will be a category prediction of the pixel corresponding to the location. This results in fast processing times which is needed for real-time applications requiring optical character recognition, such as, for example, detecting text in a real time video feed, detecting text in a live feed of a screenshare, removing text from images or videos for GDPR compliance, and real time execution of optically driven processes.

FIG. 1 shows an example of an overall computer system ("the system") 100 to facilitate the control of single pass optical character recognition in accordance with exemplary embodiments of the present disclosure. The system may include an OCR platform 112, at least one user interface device 101, and at least one network 110. Although not shown, the system 100 may include one or more electronic communications channels for transmitting data between user interface device 101, network 110, and OCR platform 112. While a limited number of user interface device, network and OCR platform have been shown, any number of these elements may be used. Moreover, while the user interface device 101 and OCR platform 112 are shown in FIG. 1 as separate entities, it should be understood that the various components/entities can be integrated into each other.

The OCR platform 112 can be connected to receive input (e.g., electronic images containing machine printed characters) from user interface device 101 over network 110 (e.g., wide area network). The network 110 can be configured to transmit and receive information over a combination of wired and wireless transmission protocols as desired. The OCR platform may include at least one fully convolutional neural network (FCN) engine 250 for processing the electronic image received from user interface device 101. The OCR platform may output content reflecting the end results of the processing to user interface device 101. The content can include predicted words and/or symbols from the input image.

Figure 2:
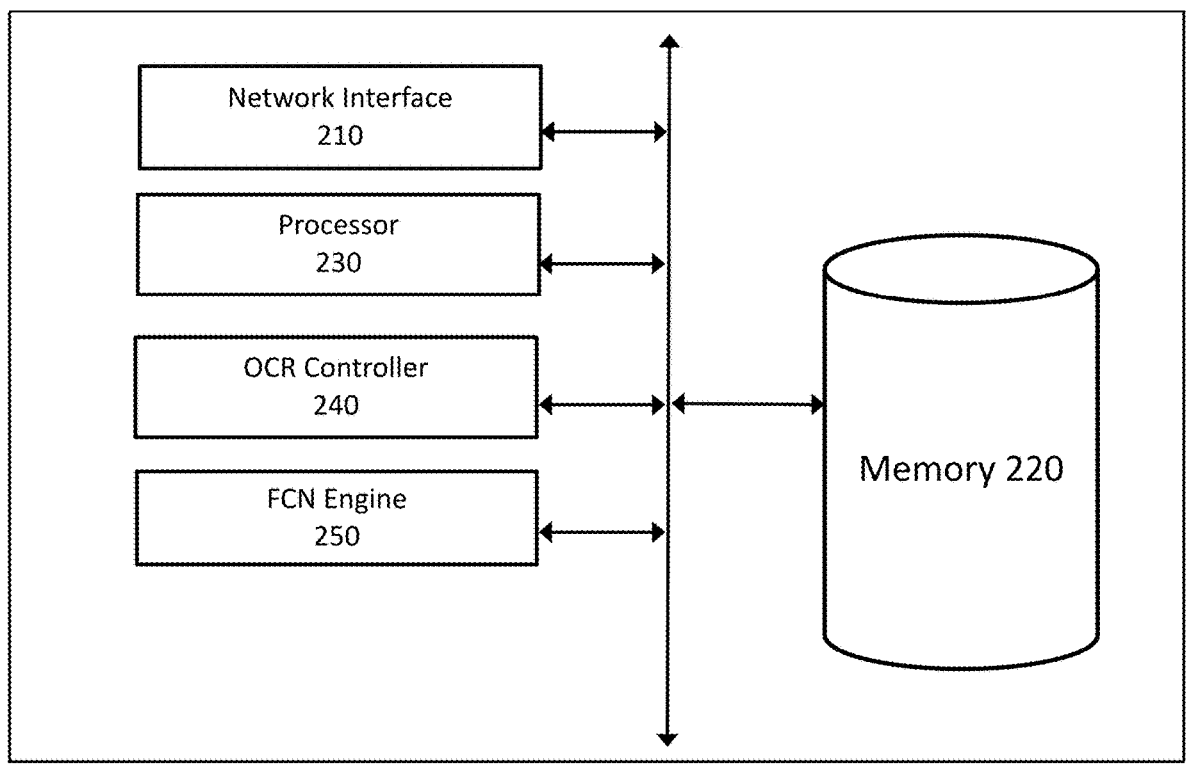
FIG. 2 is a block diagram illustrating an exemplary OCR platform operable to control single pass optical character recognition according to an exemplary embodiment of the present disclosure.

Turning to FIG. 2, the OCR platform 112 may include at least network interface 210, memory 220, at least one processor 230, OCR controller 240, a FCN engine 250 and any other combination of hardware and software components as desired. The at least one network interface 210 can be configured to receive data from user interface device 101 over network 110. As such, the at least one network interface may include any interface configuration necessary to receive data delivered to OCR platform 112 from user interface device 101, such as, for example, a wired or wireless Ethernet card and a digital and/or analog input/output card.

The memory 220 (e.g., random access memory (RAM), non-volatile secondary storage, hard drive, a floppy drive, and a CD-ROM drive) may store user input data (e.g., electronic images including machine printed characters), computer executable instructions (e.g., FCN engine 250 computer executable instructions), business rules (e.g., FCN engine business logic rules), at least one database and other data (e.g., FCN engine data).

The at least one processor may include a microprocessor, central processing unit (CPU), a graphics processing unit (GPU), embedded processor, digital signal processor (DSP), FPGA, application specific integrated circuit (ASIC), floating point processor, media processor, co-processor and any other suitable computing processing unit.

The at least one processor 230 can be configured to control the operation of OCR platform 112. As such, processor 230 processes FCN engine computer executable instructions to determine the words and/or symbols (i.e., content) which are included in an input image. So, for example, processor 230 may perform optical character recognition (OCR) processing to a scanned image (i.e., an electronic input image containing machine printed characters) by processing FCN engine 250 computer executable instructions to determine the words and/or symbols within the scanned image, which effectively transfers the content and layout of the electronic image into a searchable and editable format.

The FCN engine 250 includes FCN engine computer executable instructions and a fully convolutional neural network. The fully convolutional neural network may include an input layer, one or more convolutional layers, one or more pooling layers and an output (i.e., classification) layer. In some embodiments, the fully convolutional neural network may include one or more batch normalization layers, one or more fully connected layers, and one or more non-linearity layers (e.g., ReLU). The fully convolutional neural network may be implemented on one or more graphics processing unit. The fully convolutional neural network may be trained end-to-end to. Moreover, the fully convolutional neural network performs algorithmic processing at one or more layers of the engine.

Each convolutional layer (i.e., stage) in the FCN engine 250 includes a plurality of convolutional network blocks. Each convolutional network block is configured to perform convolving operations. The one or more convolutional layers in the FCN engine 250 are responsible for extracting features (e.g., spatial features) from an input image by performing convolution operations (i.e., the systematic application of one or more filters to an image matrix). Different filters may be convolved on the input image at different convolutional layers of the FCN engine to detect different features of the input image. The FCN engine can aggregate together the detected/extracted features from each convolutional layer. The one or more filters may include at least one mathematical algorithm which is applied to an image matrix. The image matrix is a representation of the input image in the form of pixels/numbers. The filters may be learned filters that are applied to an input image in order to create a set of feature maps that summarize the presence of those features in the input image. The set of feature maps may be passed to the next convolutional layer.

So, for example, an input image may be three-dimensional (e.g. rows, columns and channels), and in turn, the one or more filters may also be three-dimensional with the same number of channels and fewer rows and columns than the input image. As such, the one or more filters can be repeatedly applied to each part of the input image, resulting in a two-dimensional output map of activations (i.e., a feature map). The feature map can be regarded as the learned representations (features) of the image including corresponding spatial dimensions (e.g., width and height).

In some embodiments, the one or more convolutional layers may be stacked. In this implementation, the layers close to the input layer may be configured to learn low-level features (e.g. edges or lines) and the layers deeper in the network may be configured to learn high-order or more abstract features, like shapes or specific objects.

Each pooling layer in the FCN engine 250 includes a plurality of pooling convolutional network blocks. Each pooling network block is configured to perform pooling (down sampling) operations. The one or more pooling layers are responsible for down sampling a feature map by performing one or more pooling operations (e.g., a mathematical algorithm) to the featured map. The resulting feature map output from the one or more convolutional layers may record the precise position of the features in the input image. Thus, any small movements in the position of any of the features in the input image will result in a different map. Such small movements in the position of a feature may result from re-cropping, rotation, shifting, and any other minor changes to the input image. The one or more pooling layers operate to address this sensitivity by down sampling the feature map which has the effect of making the resulting down sampled feature map more robust to changes in the position of the features in the image. The down sampled feature map may include, for example, the important structural elements, without the fine detail that may not be as useful to the task.

The OCR feature module includes computer executable instructions that when executed by processor 230 causes the processor to determine at least one OCR feature by calculating one or more outputs from the aggregated features, which may include, for example, wordiness score, character gap score, and character prediction, space score, and case score.

The word box module includes computer executable instructions that when executed by processor 230 causes the processor to determine boundaries between words, determine centers of the words, calculating word heights, and creating word boxes by sorting all the peak pixels from left to right and assigning each pixel in turn to an existing box.

The character prediction module includes computer executable instructions that when executed by processor 230 causes the processor to determine character boxes for each character in the word box by delineating each character in the word box by character gaps, performing a number of character predictions for each character box, aggregating the number of character predictions, multiplying the number of aggregated character predictions by a character weighting index, and determining a character for a corresponding character box by selecting a highest prediction from the result of multiplying the aggregated character predictions for a particular character box by a character weighting index.

Figure 3:
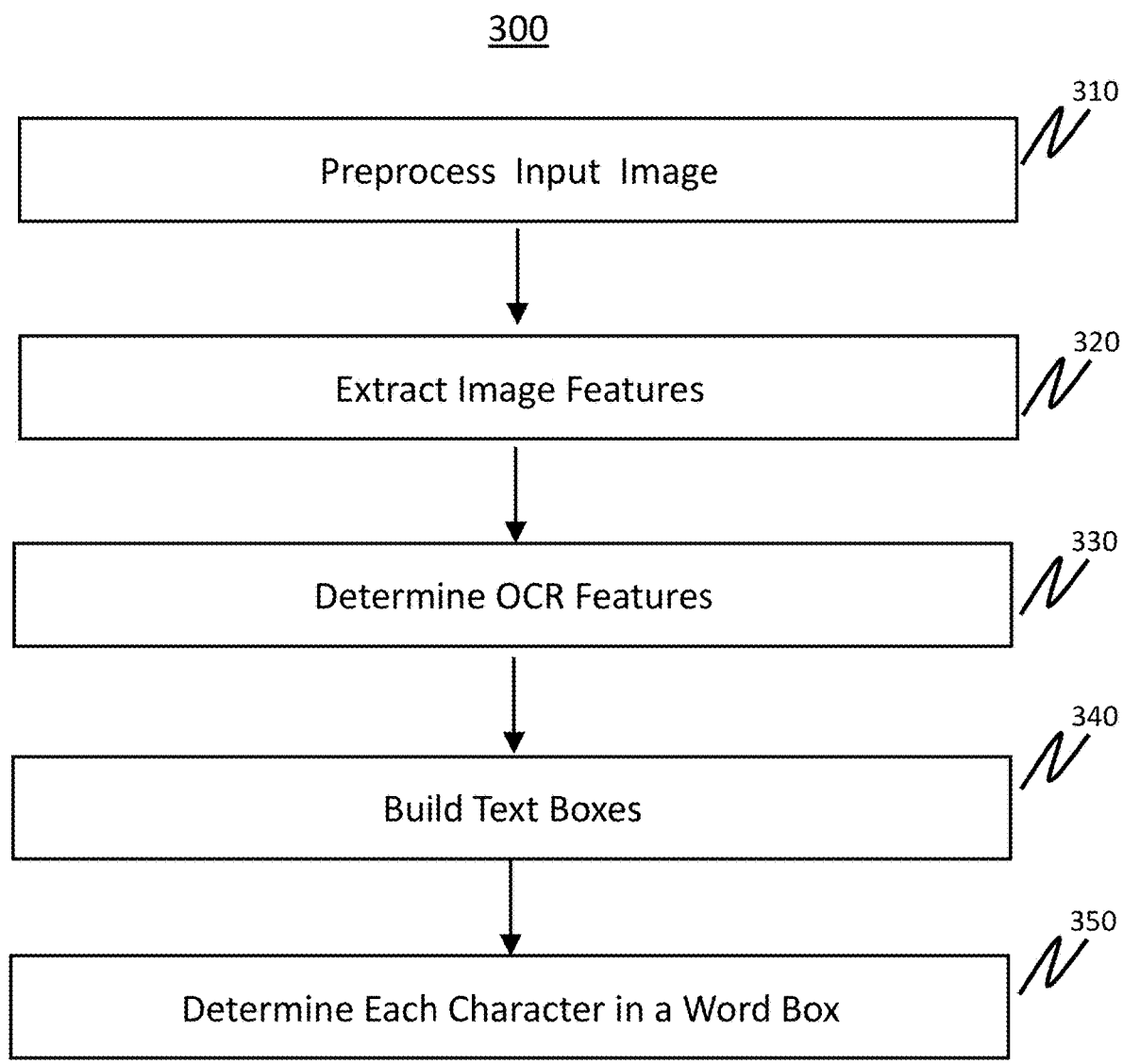
FIG. 3 illustrates a method of performing single pass optical character recognition in accordance with an exemplary embodiment of the present disclosure.

In embodiments, the processor 230 can be configured to execute the FCN engine 250 computer executable instructions to perform a single pass optical character recognition (i.e., an input image is processed once through the fully convolutional neural network to determine the words and/or symbols within the image) including the steps described in FIG. 3, which include preprocessing an input image, extracting image features; determining OCR features; build word boxes; build (i.e., perform) character predictions and output (i.e., transmit for display) the determined words and/or symbols within the input image.

The FCN engine 250 computer executable instructions are converted to executable codes. The executable codes are committed to memory 220 using machine codes selected from a specific machine language instruction set, or native instructions, designed into the hardware processor. The hardware processor is configured to perform a predefined set of logic operations in response to receiving a corresponding basic instruction selected from a predefined native instruction set of machine codes. Each native instruction is a discrete code that is recognized by the hardware processor and that can specify particular registers for arithmetic, addressing, or control functions; particular memory locations or offsets; and particular addressing modes used to interpret operands. The computer executable instructions correspond to a set of machine codes selected from the native instruction set that are processed by the hardware processor.

Processor 230 can be configured to control OCR control module 240 to determine when a request to perform optical character recognition on an input image is received; to initiate execution of FCN engine 250 and to output (i.e., initiate a transfer) the results to user interface device 101 for display.

The at least one user interface device 101 can be any computer processing device, such as, for example, a mobile phone, laptop, desktop, any kind of handheld computer processing system, a personal computer, minicomputer, microprocessor, workstation, mainframe, or similar computing platform. The user interface device may include memory, communication modules, at least one processor, a display, a machine printing device (e.g., scanner, camera, etc.), and applications, including an OCR application. The communication modules may include a network module, such as, for example, a wireless network card, for communication with network 110 and OCR platform 112. The communication modules can be microprocessors embedded with computer readable instructions that when executed perform various communication functions.

The user interface devices 101a-b may include a controller and data storage device (not shown). The controller can include one or more microprocessors, computer readable memory (e.g., read-only memory (ROM), random access memory (RAM), mechanisms and structures for performing I/O operations. The controller can execute an operating system for execution on the central processing unit and one or more application programs to control the operation of the user interface devices. The data storage device stores one or more databases, the operating system and one or more application programs.

The OCR application may comprise multiple hardware or software modules, containing program instructions that cause the at least processor to perform a variety of specific tasks required to receive/send data from/to OCR platform 112. The OCR application may provide a user interface to receive a machine printed document as an input for processing by OCR platform 112.

Network 110 may include a plurality of computers or servers (not shown) located in many different geographic locations. The servers may include, for example, web servers, streaming servers, and media servers. The network system may comprise, for example, a wide area network (WAN), a local area network (LAN) or the Internet. The network can provide communications among the devices in the computer system 100 using one or more communications protocols, such as, for example, hypertext transfer protocol (HTTP), transmission control protocol (TCP), file transfer protocol (FTP), real-time transfer protocol (RTP), real-time streaming protocol (RTSP) and real-time transport control protocol (RTCP).

Referring to FIG. 3 an exemplary high level flow diagram 300 of the method for performing single pass optical character recognition is illustrated. At step 310, pre-processing of an input image by the FCN engine 250 is performed. The input image may include machine printed characters. There are a series of pre-processing operations that may be performed on the image to render the image suitable for the next stage of processing (i.e., feature extraction). The operations may include, for example, converting the image into a suitable format, such as, for example, splitting the image into distinct channels in B, G, R format and storing the split image into memory. Moreover, the image may be padded with zero values to a specified dynamic denominator (i.e., padding the image). The dynamic denominator may be specified by the nature of the subsequent convolutional neural network in the FCN engine.

At step 320, the visual features of the image are extracted. The process for extracting the visual features may include filtering the image to extract visual features (e.g., spatial features) of the image in small chunks to create one or more hidden layers of convolutional network blocks (i.e., convolutional layers) of the FCN engine. The spatial features of the image refer to the arrangement of pixels and the relationship between them in an image. Pooling (down sampling) may also be performed, which downsamples the image using the convolutional network blocks. Thereafter, batch normalization and leaky rectified linear unit (ReLU) processing by one or more scales may be performed. The pixel level features are calculated and reserved for later use. The features may be detected using a fully convolutional, residual network which may include, for example, 3×3, 1×1, skip and leaky ReLU blocks, which may return multiple layers (e.g., four layers) of features detected at different scales which aggregate together to provide a wider field of view for the final layers. The aggregate features are then combined with the pixel features to attenuate small scale differences.

Figure 4A:
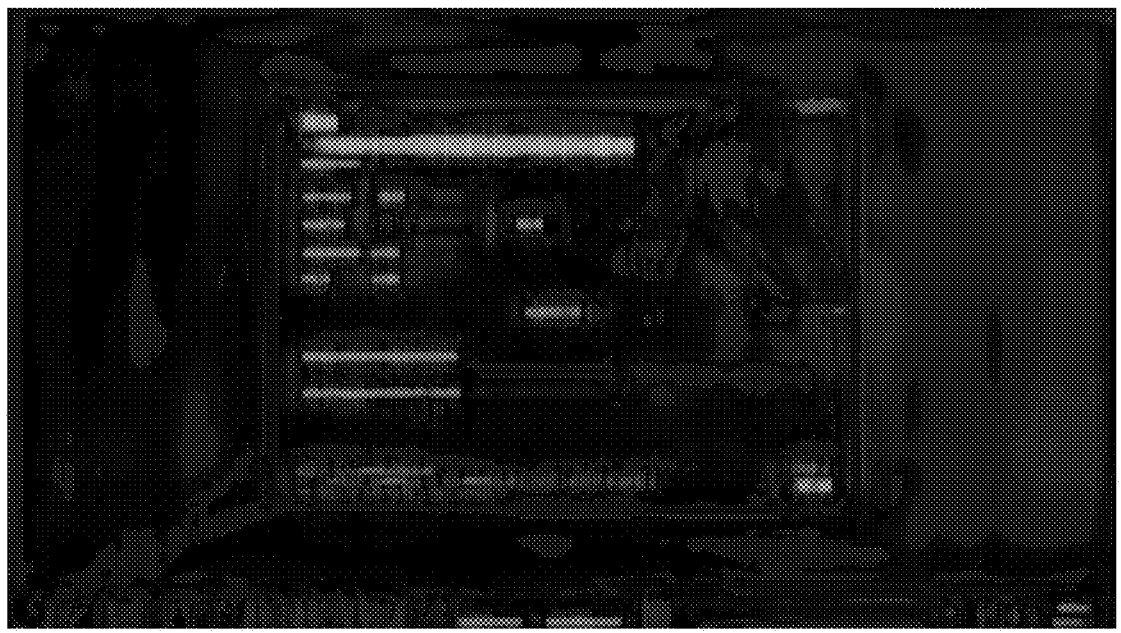
FIG. 4A shows an exemplary graphical representation of an output for creating optical character recognition features according to an embodiment of the present disclosure.

At step 330, the optical character recognition (OCR) features are determined by calculating one or more outputs from the aggregated features of step 320. The one or more calculated outputs may include, for example, wordiness score, character gap score, and character prediction, space score, and case score. The wordiness score is a prediction of how likely it is that the pixel level feature belongs to a word. The character gap score is a prediction of the likelihood that the pixel level feature belongs to a gap between two characters. The character prediction is a prediction for N distinct characters, of how likely it is that the pixel is part of a specific character. The character predictions are split into two components. The character index [0-N] and the prediction [0-1]. Space score represents the likelihood the current character is a space between words [0-1]. Case score represents the likelihood that the character is upper case [0-1]. A necessary improvement to maintain lower processing latency, is to process the character, space and case scores at a lower granularity than the wordiness and character gap scores. For this purpose, the segments at step 320 may make use of a strided convolution when required. FIG. 4A illustrates a graphical output of the one or more calculated outputs, green represents wordiness score, blue represents character gap, and red represents character prediction index.

The one or more outputs are then scaled back up to an original size using, for example, bilinear interpolation for the wordiness score, nearest neighbor interpolation for the character gap and character score. The results may be masked using the wordiness score and pixels belonging to a nominal wordiness score of less than 0.25 may be set to zero.

At step 340, the text/word boxes are built. Boundaries between words may be determined by looking for valleys in the wordiness gradients. The center of the words may be determined by looking for peaks in the wordiness score. The word heights may be calculated by finding two valleys with a peak between them. More specifically, the height may be calculated using the distance between, for example, (top valley average−1.25 standard deviation) and (bottom valley average+1.25 standard deviation).

Figure 4B:
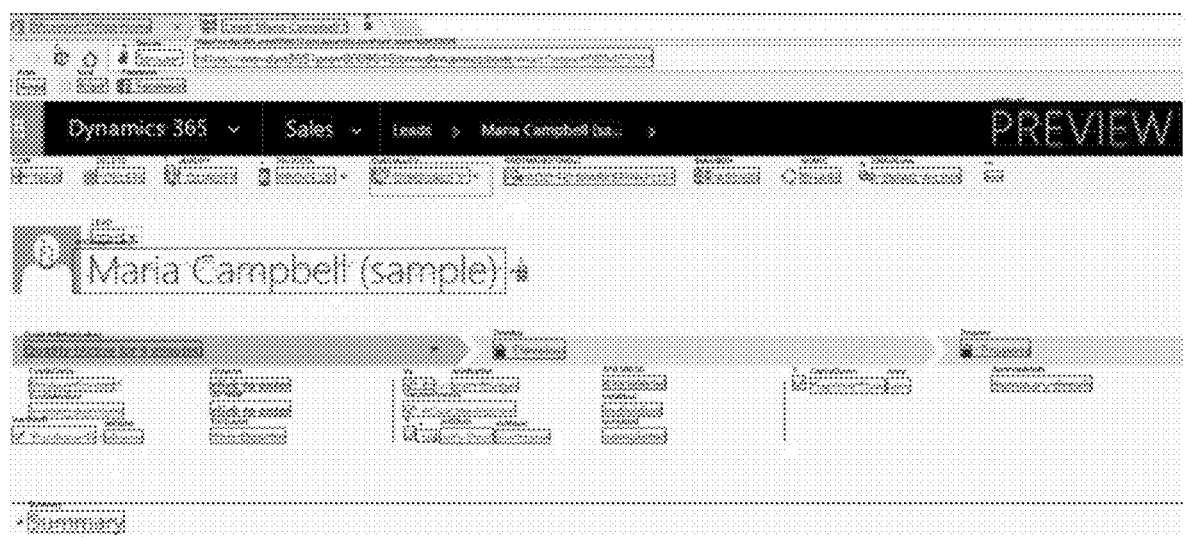
FIG. 4B shows an exemplary graphical representation of word/text boxes built according to an embodiment of the present disclosure.

The boxes may be created by sorting all the peak pixels from left to right and assigning each pixel on turn to an existing box. So, for example, a pixel may be assigned to an existing box if the pixel lies between the current top and bottom of that box and is close to the right end of the box. If no such box exists, a new box is started using the current peak, top and bottom values. Assigning a pixel to a box extends that box to the right to include that pixel and its related top and bottom values. Referring to FIG. 4B, a graphical illustration of the built word boxes is shown. The word boxes are blue and the centers are outlined in red.

Figure 4C:
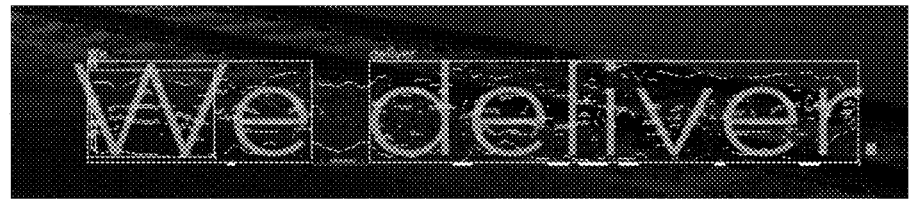
FIG. 4C shows an exemplary graphical representation of character predictions built according to an embodiment of the present disclosure.

At step 350, each character within each word box is determined based on character predictions. Characters within each word box are delineated by character gaps thereby forming a character box for each character. Within each character box, the individual character is determined by examining the top N character predictions. More specifically, the top N characters are aggregated, then multiplied by a character weighting index which give higher precedence to narrow characters. The highest prediction is chosen. FIG. 4C illustrates an exemplary graphical representation of results of the built character predictions. The character gaps are show in yellow, and spaces are shown in pink. The end result is that all words on the screen are located (pixel coordinates) and predictions for each character of the word are given in a single pass with the fully convolutional neural network engine.

In an embodiment, a system includes at least one FCN engine including at least one processor and at least one memory. The memory including instructions that, when executed by the at least one processor, cause the FCN engine 250 to perform the steps set forth in FIG. 3.

In a further embodiment, a computer-implemented method including at least one FCN engine including at least one processor and at least one memory. The memory including instructions that, when executed by the at least one processor, cause the FCN engine to perform the steps set forth in FIG. 3.

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art. Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. A computer implemented method of performing single pass optical character recognition (OCR) including at least one fully convolutional neural network (FCN) engine including at least one processor and at least one memory, the at least one memory including instructions that, when executed by the at least one processor, cause the at least one processor to perform operations comprising:
    preprocessing an input image, wherein the input image includes machine printed characters;
    extracting image features from the input image using a plurality of convolutional layers included in the FCN engine, wherein the image features of the input image are extracted at each convolutional layer of the FCN engine;
    aggregating the image features extracted at each convolutional layer of the FCN engine;
    determining at least one optical character recognition (OCR) feature from the aggregated extracted image features, wherein determining the at least one OCR feature from the aggregated extracted image features includes calculating a character gap score for the aggregated extracted image features;
    building word boxes using the determined at least one OCR feature;
    determining each character within each of the word boxes based on character predictions; and
    transmitting, for display, each of the word boxes including corresponding determined characters.

2. The computer implemented method of claim 1, wherein preprocessing the input image includes padding the input image with zero values.

3. The computer implemented method of claim 1, wherein extracting the image features from the input image includes filtering the input image at each convolutional layer of the FCN engine thereby extracting the image features from the input image at each convolutional layer.

4. The computer implemented method of claim 1, wherein determining the at least one OCR feature from the aggregated extracted image features includes calculating a wordiness score.

5. The computer implemented method of claim 1, wherein determining the at least one OCR feature from the aggregated extracted image features includes calculating character predictions.

6. The computer implemented method of claim 1, wherein building the word boxes includes determining boundaries between words.

7. The computer implemented method of claim 1, building the word boxes includes determining centers of words.

8. The computer implemented method of claim 1, wherein determining each character within each of the word boxes based on the character predictions includes determining character boxes for each character in each of the word boxes by delineating each character in each of the word boxes by character gaps.

9. The computer implemented method of claim 8, wherein a number of the character predictions are made for each character box and the character predictions are aggregated.

10. The computer implemented method of claim 9, wherein a character determination is made by selecting a highest prediction from a result of multiplying the aggregated character predictions by a character weighting index.

11. A system for performing single pass optical character recognition (OCR), the system comprising:
    a network interface configured to receive an input image, wherein the input image includes machine printed characters;
    a memory configured to store electronic program guide data and computer executable instructions;
    an FCN engine including at least one processor configured to execute the computer executable instructions to:
        preprocess the input image by padding the input image with zero values;
        extract image features from the input image using a plurality of convolutional layers included in the FCN engine, wherein image features of the input image are extracted at each convolutional layer of the FCN engine;
        aggregate the image features extracted at each convolutional layer of the FCN engine;
        determine at least one optical character recognition (OCR) feature from the aggregated extracted image features;
        build word boxes using the determined at least one OCR feature;
        determine each character within each of the word boxes based on character predictions, wherein a character determination for each character is made by selecting a highest prediction from a result of multiplying an aggregate of the character predictions by a character weighting index; and
        transmit, for display, each of the word boxes including its predicted corresponding characters.

12. The system of claim 11, wherein the determined at least one OCR feature is a calculated wordiness score.

13. The system of claim 11, wherein the determined at least one OCR feature is a calculated character gap score.

14. The system of claim 11, wherein the determined at least one OCR feature is calculated character predictions.

15. The system of claim 11, wherein building the word boxes includes determining boundaries between words.

16. The system of claim 11, wherein building the word boxes includes determining centers of words.

17. The system of claim 11, wherein determining each character within each of the word boxes based on the character predictions includes determining character boxes for each character in each of the word boxes by delineating each character in each of the word boxes by character gaps.

18. The system of claim 11, wherein a number of the character predictions are made for each character box and the character predictions are aggregated.

\* \* \* \* \*